(12) United States Patent
Yoshino et al.

(10) Patent No.: US 12,012,117 B2
(45) Date of Patent: Jun. 18, 2024

(54) TRAVEL CONTROLLER, METHOD FOR TRAVEL CONTROL, AND NON-TRANSITORY COMPUTER-READABLE MEDIUM CONTAINING COMPUTER PROGRAM FOR TRAVEL CONTROL

(71) Applicant: TOYOTA JIDOSHA KABUSHIKI KAISHA, Toyota (JP)

(72) Inventors: Soichi Yoshino, Ichikawa (JP); Shota Fujii, Tokyo-to (JP); Yu Okada, Ichikawa (JP); Takuo Kaneko, Tokyo-to (JP); Suzuka Kondo, Nishitokyo (JP); Eiki Kitagawa, Tokyo-to (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 274 days.

(21) Appl. No.: 17/695,290

(22) Filed: Mar. 15, 2022

(65) Prior Publication Data

US 2022/0306144 A1 Sep. 29, 2022

(30) Foreign Application Priority Data

Mar. 25, 2021 (JP) ................................. 2021-051295

(51) Int. Cl.
*B60W 50/14* (2020.01)
*B60W 30/18* (2012.01)

(52) U.S. Cl.
CPC ...... *B60W 50/14* (2013.01); *B60W 30/18163* (2013.01); *B60W 2540/215* (2020.02); *B60W 2552/10* (2020.02)

(58) Field of Classification Search
CPC .......... B60W 50/14; B60W 30/18163; B60W 2540/215; B60W 2552/10
See application file for complete search history.

(56) References Cited

U.S. PATENT DOCUMENTS

2018/0348758 A1 12/2018 Nakamura et al.
2019/0202471 A1 7/2019 Hashimoto

FOREIGN PATENT DOCUMENTS

| JP | 2018-203007 A | 12/2018 |
| JP | 2019-119269 A | 7/2019 |
| JP | 2020-033013 A | 3/2020 |
| WO | 2020/065892 A1 | 4/2020 |

*Primary Examiner* — Michael D Lang
(74) *Attorney, Agent, or Firm* — Oliff PLC

(57) ABSTRACT

A travel controller sets a check level depending on the situation of a lane change from a travel lane of a vehicle to a different lane before the lane change. The travel controller requests a first pre-lane-change action for the check at the lane change of the driver with a notification device when the check level is higher than a level threshold, and requests a second pre-lane-change action for the check at the lane change of the driver with the notification device when the check level is lower than the level threshold. The travel controller controls travel of the vehicle to make the lane change in the case that the driver has performed the first or second pre-lane-change action having been requested and that the situation around the vehicle satisfies a surrounding condition to be satisfied at the lane change.

6 Claims, 5 Drawing Sheets

TRAVEL CONTROLLER, METHOD FOR TRAVEL CONTROL, AND NON-TRANSITORY COMPUTER-READABLE MEDIUM CONTAINING COMPUTER PROGRAM FOR TRAVEL CONTROL

FIELD

The present disclosure relates to a controller and a method for controlling travel of a vehicle and to a non-transitory computer-readable medium containing a computer program therefor.

BACKGROUND

In some cases, a vehicle driver is requested to perform a predetermined action for checking the surroundings for his/her vehicle to change lanes more safely under control by a travel controller.

Japanese Unexamined Patent Publication No. 2020-033013 (hereafter "Patent Literature 1") describes a driving assistance device that prompts a driver to make a safety check when his/her vehicle automatically changes lanes. The device described in Patent Literature 1 permits an automatic lane change only if it is determined that the driver has performed a predetermined action for a safety check at a lane change, based on the detected state of the driver.

SUMMARY

In some cases, it can be determined that the situation around a vehicle allows a lane change, without a predetermined action by the driver, depending on the state of the driver or the circumstances at the lane change. For example, at a lane change to a lane diverging from the current travel lane, a travel controller can determine that the situation allows the lane change, without requesting the driver to check the surroundings, because no vehicle probably exists on the destination lane. When a lane change is made in response to the driver's request, a travel controller can also determine that the situation allows the lane change, without requesting the driver to check the surroundings, because the driver probably requests the lane change after such a check. A travel controller that requests the driver to check the surroundings indiscriminately even in such situations annoys the driver.

It is an object of the present disclosure to provide a travel controller that enables an appropriate lane change without annoying a driver.

A travel controller according to the present disclosure includes a processor configured to set a check level depending on the situation of a lane change from a travel lane of a vehicle to a different lane before the lane change. The check level indicates how closely a driver of the vehicle should check a surrounding area at the lane change. The processor of the travel controller is further configured to request a first pre-lane-change action for the check at the lane change of the driver with a notification device when the check level is higher than a level threshold, and request a second pre-lane-change action for the check at the lane change of the driver with the notification device when the check level is lower than the level threshold. The second pre-lane-change action is a lighter burden to the driver than the first pre-lane-change action. The processor of the travel controller is further configured to control travel of the vehicle to make the lane change in the case that the driver has performed the first or second pre-lane-change action having been requested and that the situation around the vehicle satisfies a surrounding condition to be satisfied at the lane change.

The processor of the travel controller according to the present disclosure in the setting preferably determines whether another vehicle exists in a predetermined section of the different lane, and sets the check level higher when it is determined that another vehicle exits than when not.

The processor of the travel controller according to the present disclosure in the setting preferably sets the check level lower than the level threshold in the case that the vehicle traveling on the different lane makes a lane change to the travel lane to pass a passing-target vehicle traveling ahead on the different lane and then makes a lane change to the different lane ahead of the passing-target vehicle and that no vehicle is detected in the predetermined section from the passing-target vehicle to a predetermined distance away.

The processor of the travel controller according to the present disclosure in the setting preferably sets the check level lower when the lane change is based on instructions of the driver than when not.

A method for travel control according to the present disclosure includes setting a check level depending on the situation of a lane change from a travel lane of a vehicle to a different lane before the lane change. The check level indicates how closely a driver of the vehicle should check a surrounding area at the lane change. The method further includes requesting a first pre-lane-change action for the check at the lane change of the driver with a notification device when the check level is higher than a level threshold, and requesting a second pre-lane-change action for the check at the lane change of the driver with the notification device when the check level is lower than the level threshold. The second pre-lane-change action is a lighter burden to the driver than the first pre-lane-change action. The method further includes controlling travel of the vehicle to make the lane change in the case that the driver has performed the first or second pre-lane-change action having been requested and that the situation around the vehicle satisfies a surrounding condition to be satisfied at the lane change.

A computer program for travel control stored in a non-transitory computer-readable medium according to the present disclosure causes a computer to execute a process including setting a check level depending on the situation of a lane change from a travel lane of a vehicle to a different lane before the lane change. The check level indicates how closely a driver of the vehicle should check a surrounding area at the lane change. The process further includes requesting a first pre-lane-change action for the check at the lane change of the driver with a notification device when the check level is higher than a level threshold, and requesting a second pre-lane-change action for the check at the lane change of the driver with the notification device when the check level is lower than the level threshold. The second pre-lane-change action is a lighter burden to the driver than the first pre-lane-change action. The process further includes controlling travel of the vehicle to make the lane change in the case that the driver has performed the first or second pre-lane-change action having been requested and that the situation around the vehicle satisfies a surrounding condition to be satisfied at the lane change.

The travel controller according to the present disclosure enables an appropriate lane change without annoying the driver.

DESCRIPTION OF EMBODIMENTS

A travel controller that enables an appropriate lane change without annoying a driver will now be described in detail with reference to the attached drawings. The travel controller sets a check level depending on the situation of a lane change from a travel lane of a vehicle to a different lane before the lane change. The check level indicates how closely a driver of the vehicle should check a surrounding area at the lane change. The travel controller then determines a pre-lane-change action for the check at the lane change, depending on the set check level, and requests the pre-lane-change action of the driver with a notification device. The pre-lane-change action requested of the driver by the travel controller is a heavier burden to the driver as the set check level increases. When the check level is higher than a level threshold, the travel controller requests a first pre-lane-change action for the check at the lane change of the driver. When the check level is lower than the level threshold, the travel controller requests a second pre-lane-change action for the check at the lane change of the driver. The second pre-lane-change action is a lighter burden to the driver than the first pre-lane-change action. The travel controller controls travel of the vehicle to make the lane change in the case that the driver has performed the first or second pre-lane-change action having been requested and that the situation around the vehicle satisfies a surrounding condition to be satisfied at the lane change.

Figure 1:
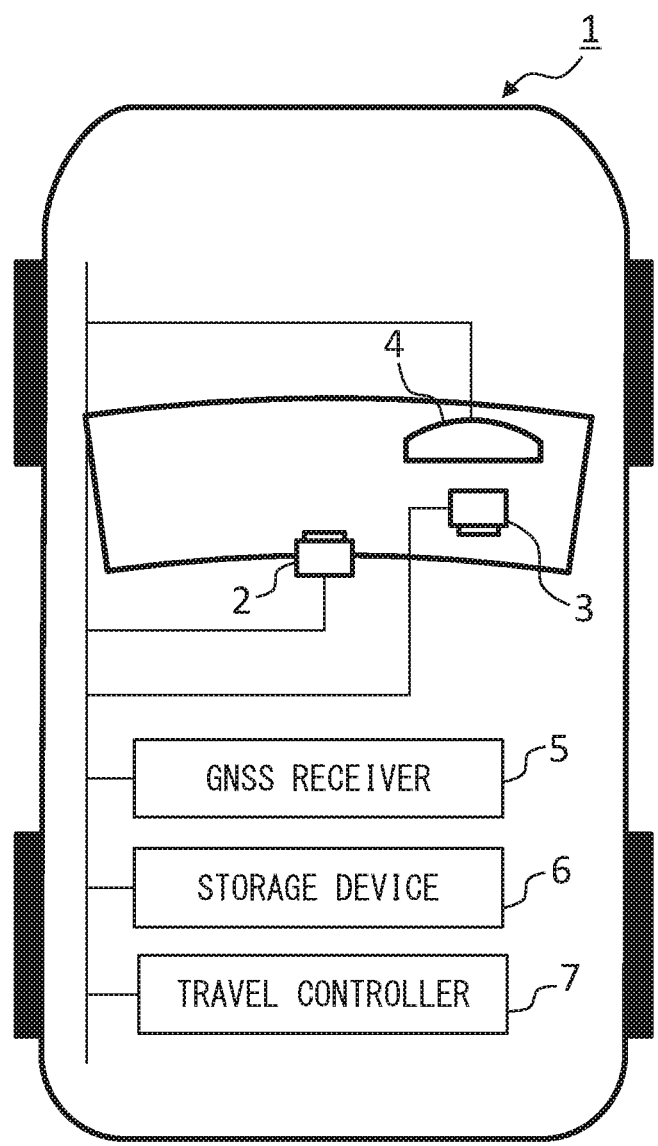
FIG. 1 schematically illustrates the configuration of a vehicle equipped with a travel controller.

FIG. 1 schematically illustrates the configuration of a vehicle equipped with the travel controller.

The vehicle 1 includes a surround capturing camera 2, a driver monitoring camera 3, a meter display 4, a global navigation satellite system (GNSS) receiver 5, a storage device 6, and a travel controller 7. The surround capturing camera 2, the driver monitoring camera 3, the meter display 4, the GNSS receiver 5, and the storage device 6 are connected to the travel controller 7 via an in-vehicle network conforming to a standard, such as a controller area network, so that they can communicate with each other.

The surround capturing camera 2 is an example of a surround capturing unit for generating an image representing the surroundings of the vehicle. The surround capturing camera 2 includes a two-dimensional detector constructed from an array of optoelectronic transducers, such as CCD or C-MOS, having sensitivity to visible light and a focusing optical system that forms an image of a target region on the two-dimensional detector. The surround capturing camera 2 is disposed, for example, in a front and upper area in the interior of the vehicle and oriented forward, takes a picture of the surroundings of the vehicle 1 through a windshield every predetermined capturing period (e.g., $\frac{1}{30}$ to $\frac{1}{10}$ seconds), and outputs images representing the surroundings.

The driver monitoring camera 3 is an example of a driver capturing unit for generating a face image representing a face region of the vehicle driver. The driver monitoring camera 3 includes a two-dimensional detector constructed from an array of optoelectronic transducers, such as CCD or C-MOS, having sensitivity to infrared light, a focusing optical system that forms an image of a target region on the two-dimensional detector, and a light source that emits infrared light. The driver monitoring camera 3 is mounted, for example, in a front area in the interior of the vehicle and oriented toward the face of the driver sitting on the driver's seat. The driver monitoring camera 3 irradiates the driver with infrared light every predetermined capturing period (e.g., $\frac{1}{30}$ to $\frac{1}{10}$ seconds), and sequentially outputs images representing the driver's face.

The meter display 4, which is an example of the notification device, includes, for example a liquid crystal display. The meter display 4 displays a screen for requesting the driver to perform a predetermined action for checking the surroundings, according to a signal received from the travel controller 7 via the in-vehicle network.

The GNSS receiver 5 receives GNSS signals from GNSS satellites at predetermined intervals, and determines the position of the vehicle 1, based on the received GNSS signals. The GNSS receiver 5 outputs positioning signals each indicating the result of determination of the position of the vehicle 1 based on the GNSS signals to the travel controller 7 via the in-vehicle network at predetermined intervals.

The storage device 6, which is an example of a storage unit, includes, for example, a hard disk drive or a nonvolatile semiconductor memory. The storage device 6 contains a high-precision map, which includes, for example, information indicating lack-of-lane sections and lane lines on roads included in a predetermined region represented in this map.

The travel controller 7 is an electronic control unit (ECU) including a communication interface, a memory, and a processor. Before a lane change, the travel controller 7 requests a pre-lane-change action, which depends on the check level set depending on the situation of the lane change, of the driver with the meter display 4. The travel controller 7 then determines whether the driver has performed the requested pre-lane-change action and whether the situation around the vehicle 1 satisfies a surrounding condition, using an image of the surroundings and a face image received from the surround capturing camera 2 and the driver monitoring camera 3 via the communication interface, and changes lanes, based on the result of determination.

Figure 2:
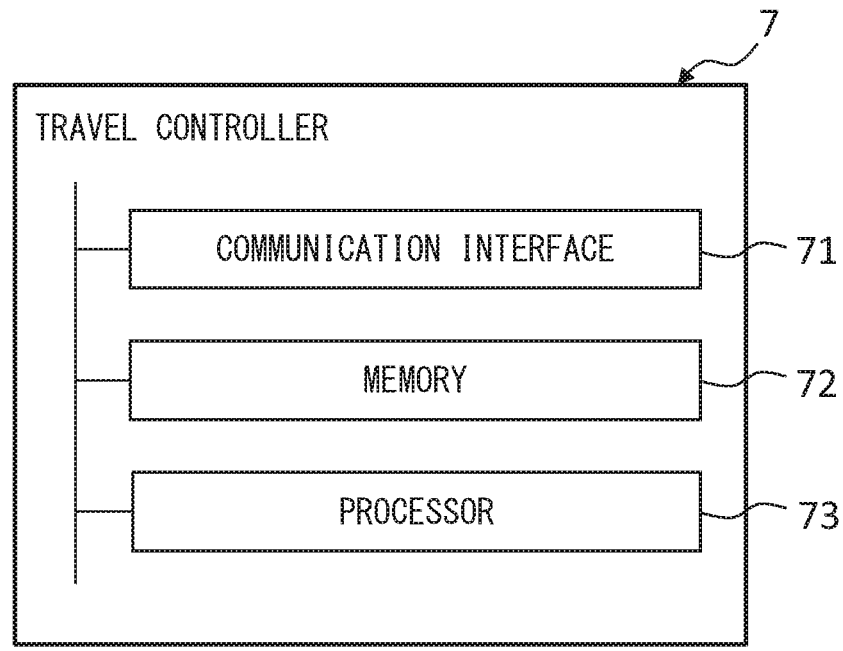
FIG. 2 schematically illustrates the hardware of the travel controller.

FIG. 2 schematically illustrates the hardware of the travel controller 7.

The communication interface 71, which is an example of a communication unit, includes a communication interface circuit for connecting the travel controller 7 to the in-vehicle network. The communication interface 71 provides received data for the processor 73, and outputs data provided from the processor 73 to an external device.

The memory 72, which is an example of a storage unit, includes volatile and nonvolatile semiconductor memories. The memory 72 contains various types of data used for processing by the processor 73, e.g., a situation table that associates situation conditions, which are for determining situations that no vehicle probably approaches from behind on a target lane at a lane change from the current travel lane to the target lane, with check levels indicating how closely the driver should check a surrounding area at the lane change. As the various types of data used for processing by the processor 73, the memory 72 further contains the level threshold for determining a pre-lane-change action to be requested depending on the check level, a request message notified to the driver for requesting the pre-lane-change action, and surrounding conditions to be satisfied by the surroundings for a lane change. Additionally, the memory 72 temporarily contains the situations of lane changes made within a predetermined period. The memory 72 also contains various application programs, such as a computer program for travel control to execute a travel control process.

The processor 73, which is an example of an information processing unit, includes one or more processors and a peripheral circuit thereof. The processor 73 may further include another operating circuit, such as a logic-arithmetic unit, an arithmetic unit, or a graphics processing unit.

Figure 3:
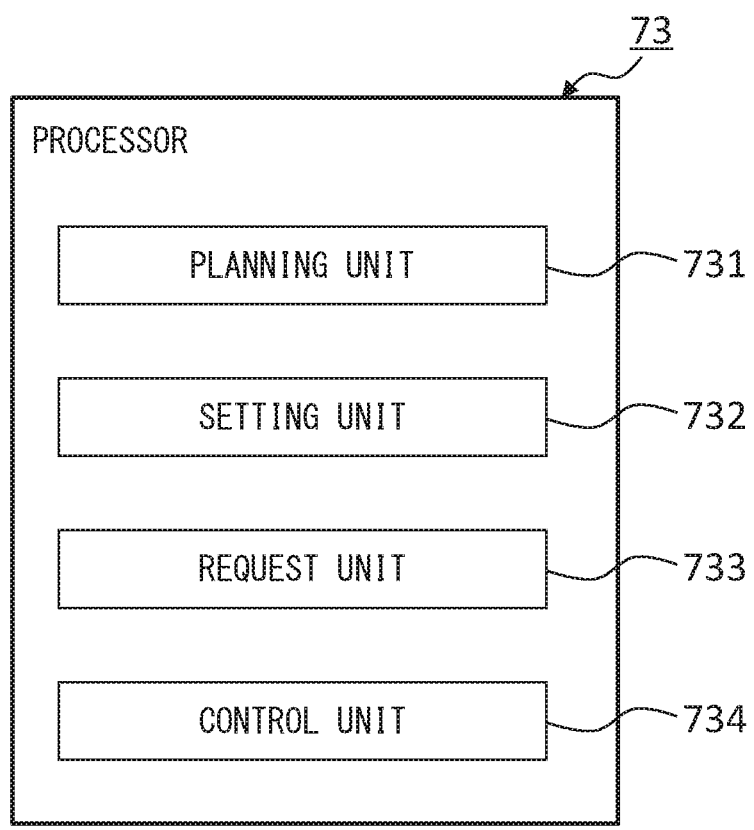
FIG. 3 is a functional block diagram of a processor included in the travel controller.

FIG. 3 is a functional block diagram of the processor 73 included in the travel controller 7.

As its functional blocks, the processor 73 of the travel controller 7 includes a planning unit 731, a setting unit 732, a request unit 733, and a control unit 734. These units included in the processor 73 are functional modules implemented by a program executed on the processor 73. The computer program for achieving the functions of the units of the processor 73 may be provided in a form recorded on a computer-readable and portable medium, such as a semiconductor memory, a magnetic recording medium, or an optical recording medium. Alternatively, the units included in the processor 73 may be implemented in the travel controller 7 as separate integrated circuits, microprocessors, or firmware.

The planning unit 731 plans a lane change for the vehicle 1 to move from the current travel lane to a different lane.

The planning unit 731 determines whether a lane change is necessary, and, if so, plans a lane change. For example, the planning unit 731 detects lane lines on the road being traveled by the vehicle 1 and vehicles traveling in an area around the vehicle 1 from an image of the surroundings received from the surround capturing camera 2 via the communication interface 71. The planning unit 731 plans a lane change to a different lane, for example, when the distance to a vehicle traveling ahead on the travel lane of the vehicle 1 falls below a distance threshold.

The planning unit 731 also plans a lane change before reaching a position where a lane change is necessary for travel along a predetermined travel route (e.g., for a turn to a diverging road).

The setting unit 732 determines whether the situation of a lane change from the travel lane to a different lane satisfies one of the situation conditions for determining the situation of the lane change in the situation table stored in the memory 72, before the lane change. The setting unit 732 then sets the check level associated in the situation table with a situation condition that the situation of the lane change satisfies, as the check level indicating how closely the driver of the vehicle should check a surrounding area at the lane change.

Figure 4:
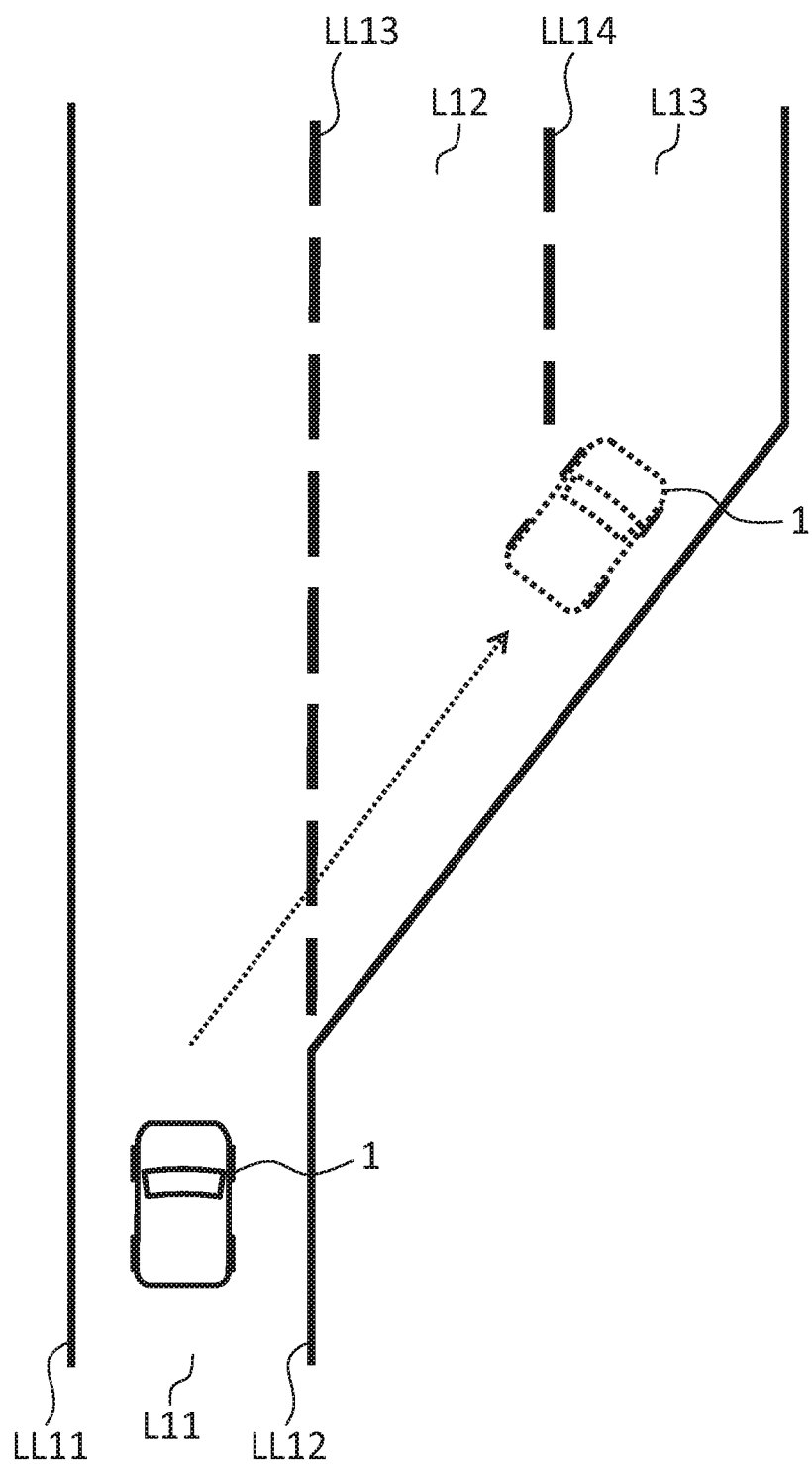
FIG. 4 is a diagram for explaining a first situation of lane changes.

FIG. 4 is a diagram for explaining a first situation of lane changes.

The setting unit 732 obtains information on lane lines around the current position of the vehicle 1, which is indicated by a positioning signal received from the GNSS receiver 5 via the communication interface 71, from the storage device 6 containing a high-precision map.

In the first situation of lane changes, the vehicle 1 makes a lane change from a current travel lane L11 demarcated by lane lines LL11 and LL12 to a target lane L13 demarcated by lane lines LL14 and LL12.

The situation that a target lane of a lane change starts ahead of the current position of the vehicle corresponds to a situation that no vehicle probably approaches from behind on a target lane. Thus, a situation condition "a target lane starts ahead of the current position" is stored in the situation table stored in the memory 72, and is associated with check level L1 lower than the level threshold.

In the first situation of lane changes, the setting unit 732 detects that the target lane L13 starts ahead of the current position of the vehicle 1, from the information on lane lines in the high-precision map. The first situation of lane changes satisfies the situation condition "a target lane starts ahead of the current position." Thus, the setting unit 732 sets check level L1 associated with the situation condition "a target lane starts ahead of the current position" as the check level in the first situation of lane changes.

Figure 5:
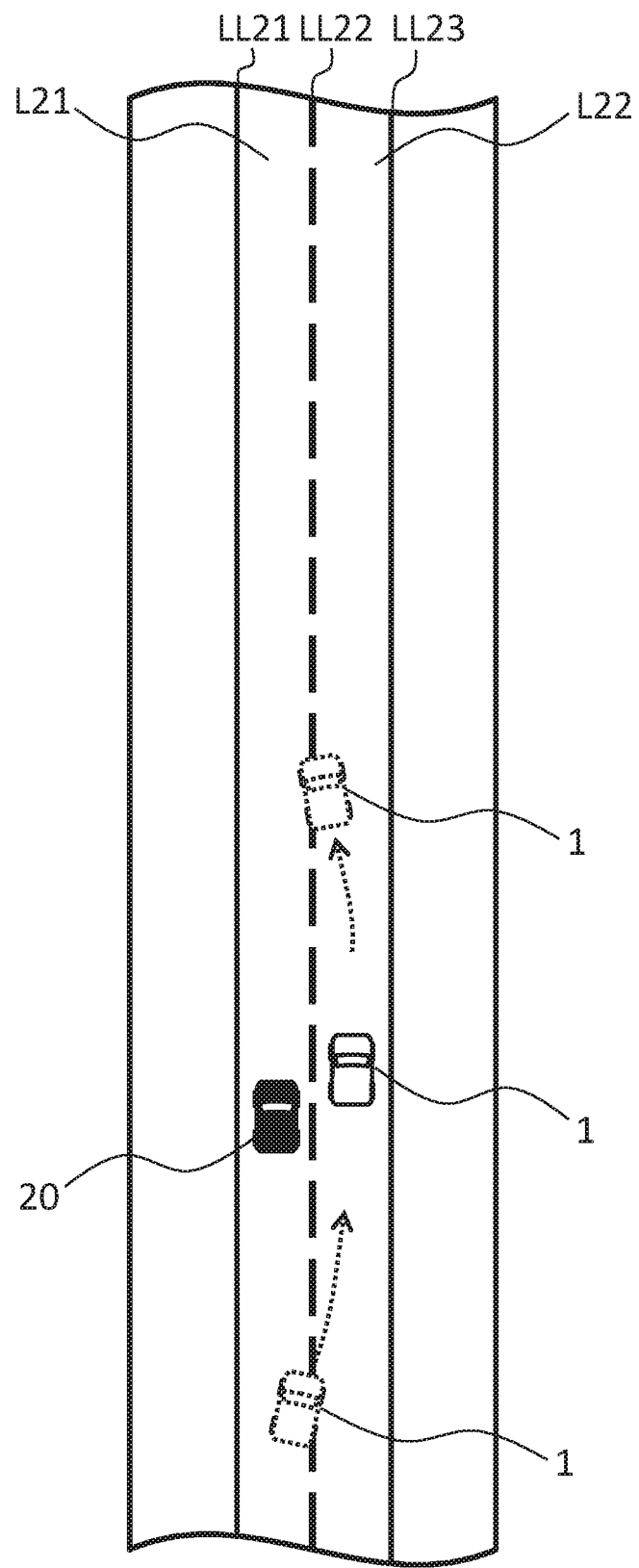
FIG. 5 is a diagram for explaining a second situation of lane changes.

FIG. 5 is a diagram for explaining a second situation of lane changes.

In the second situation of lane changes, the vehicle 1 makes a lane change from a lane L21 demarcated by lane lines LL21 and LL22 to a lane L22 demarcated by lane lines LL22, LL23, and further makes a lane change to the lane L21 ahead of a passing-target vehicle 20 traveling on the lane L21.

The situation that a lane change for returning to an initial lane is made within a predetermined period from a lane change for passing a vehicle corresponds to a situation that no vehicle probably approaches from behind on a target lane, because the situation does not change very much from when the first lane change is made. Thus, a situation condition "returning to an initial lane within a predetermined period from a lane change for passing a vehicle" is stored in the situation table stored in the memory 72, and is associated with check level L2 lower than the level threshold.

In the second situation of lane changes, the setting unit 732 obtains information indicating that a lane change for passing the passing-target vehicle 20 was made within a predetermined period, from the memory 72. The second situation of lane changes satisfies the situation condition "returning to an initial lane within a predetermined period from a lane change for passing a vehicle." Thus, the setting unit 732 sets check level L2 associated with the situation condition "returning to an initial lane within a predetermined period from a lane change for passing a vehicle" as the check level in the second situation of lane changes.

When the situation of the lane change satisfies none of the situation conditions stored in the memory 72, the setting unit 732 sets check level L0 higher than the level threshold as the check level in the situation of the lane change.

The request unit 733 compares the check level with the level threshold stored in the memory 72. When the check level is higher than the level threshold, the request unit 733 requests a first pre-lane-change action for checking a surrounding area at the lane change of the driver with the meter display 4.

The first pre-lane-change action is, for example, looking at the destination of the lane change and holding the steering wheel. The request unit 733 transmits display information for displaying character strings, such as "Please look at the destination of the lane change" and "Please hold the steering wheel," to the meter display 4 to request the first pre-lane-change action of the driver.

When the check level is lower than the level threshold, the request unit 733 requests a second pre-lane-change action for checking a surrounding area at the lane change of the driver with the meter display 4. The second pre-lane-change action is a lighter burden to the driver than the first pre-lane-change action.

The second pre-lane-change action is, for example, looking ahead and holding the steering wheel. The request unit 733 transmits display information for displaying character strings, such as "Please look ahead" and "Please hold the steering wheel," to the meter display 4 to request the second pre-lane-change action of the driver.

The request unit 733 may request the first and second pre-lane-change actions of the driver with an output device other than the meter display 4, such as a head-up display or a speaker (not shown). When requesting the pre-lane-change actions of the driver with a head-up display, the request unit 733 transmits predetermined display information to the head-up display. When requesting the pre-lane-change actions of the driver with a speaker, the request unit 733 transmits predetermined voice information to the speaker.

The control unit 734 determines whether the driver has performed the first or second pre-lane-change action having been requested.

The control unit 734 detects the driver's looking direction from a face image received from the driver monitoring camera 3 via the communication interface 71. For example, the control unit 734 detects pupils and corneal reflection images of the light source by template matching of the face image with templates representing pupils and corneal reflection images of light sources, and detects the looking direction, based on their positional relationship. The looking direction is expressed as a horizontal angle between the travel direction of the vehicle 1 and the direction in which the driver is looking. The control unit 734 determines whether the driver's looking direction is included in the destination of the lane change of the vehicle 1 (e.g., in the range of 30 degrees centered in the direction of the lane change) or in a front area (e.g., in the range of 60 degrees centered in the travel direction).

The control unit 734 determines whether the driver is holding the steering wheel, based on a signal received via the communication interface 71 from a steering wheel sensor (not shown) that outputs a signal depending on whether the steering wheel is held. The steering wheel sensor is, for example, a capacitive sensor provided for the steering wheel, and outputs a signal depending on the capacitance that varies between when the steering wheel is held by the driver and when not held.

The control unit 734 determines whether the situation around the vehicle 1 satisfies a surrounding condition, which is stored in the memory 72, to be satisfied at the lane change.

The surrounding conditions define, for example, the position and the relative speed of a vehicle traveling in an area around the vehicle 1 as well as the radii of curvature of curves and the presence or absence of a diverging or a merging lane within a predetermined range ahead of the current position of the vehicle 1.

The control unit 734 inputs an image of the surroundings received from the surround capturing camera 2 via the communication network into a classifier that has been trained to detect a road feature, thereby determining the positions of vehicles included in the image. The classifier may be, for example, a convolutional neural network (CNN) including convolution layers connected in series from the input toward the output. A CNN that has been trained using inputted images of the surroundings including vehicles as training data operates as a classifier to determine the positions of vehicles.

The control unit 734 compares the positions of a vehicle detected from respective images of the surroundings obtained at different times to calculate the speed of the vehicle relative to the vehicle 1.

The control unit 734 obtains information on a curve, a diverging lane, or a merging lane in an area around the current position of the vehicle 1, which is indicated by a positioning signal received from the GNSS receiver 5 via the communication interface 71, from the storage device 6 containing a high-precision map.

The control unit 734 controls travel of the vehicle 1 to change lanes in the case that the driver has performed the first or second pre-lane-change action having been requested and that the situation around the vehicle 1 satisfies a surrounding condition. The control unit 734 outputs a control signal to a travel mechanism (not shown) of the vehicle 1 via the communication interface 71 to change lanes. The travel mechanism includes, for example, an engine for powering the vehicle 1, brakes for decelerating the vehicle 1, and a steering mechanism for steering the vehicle 1.

Figure 6:
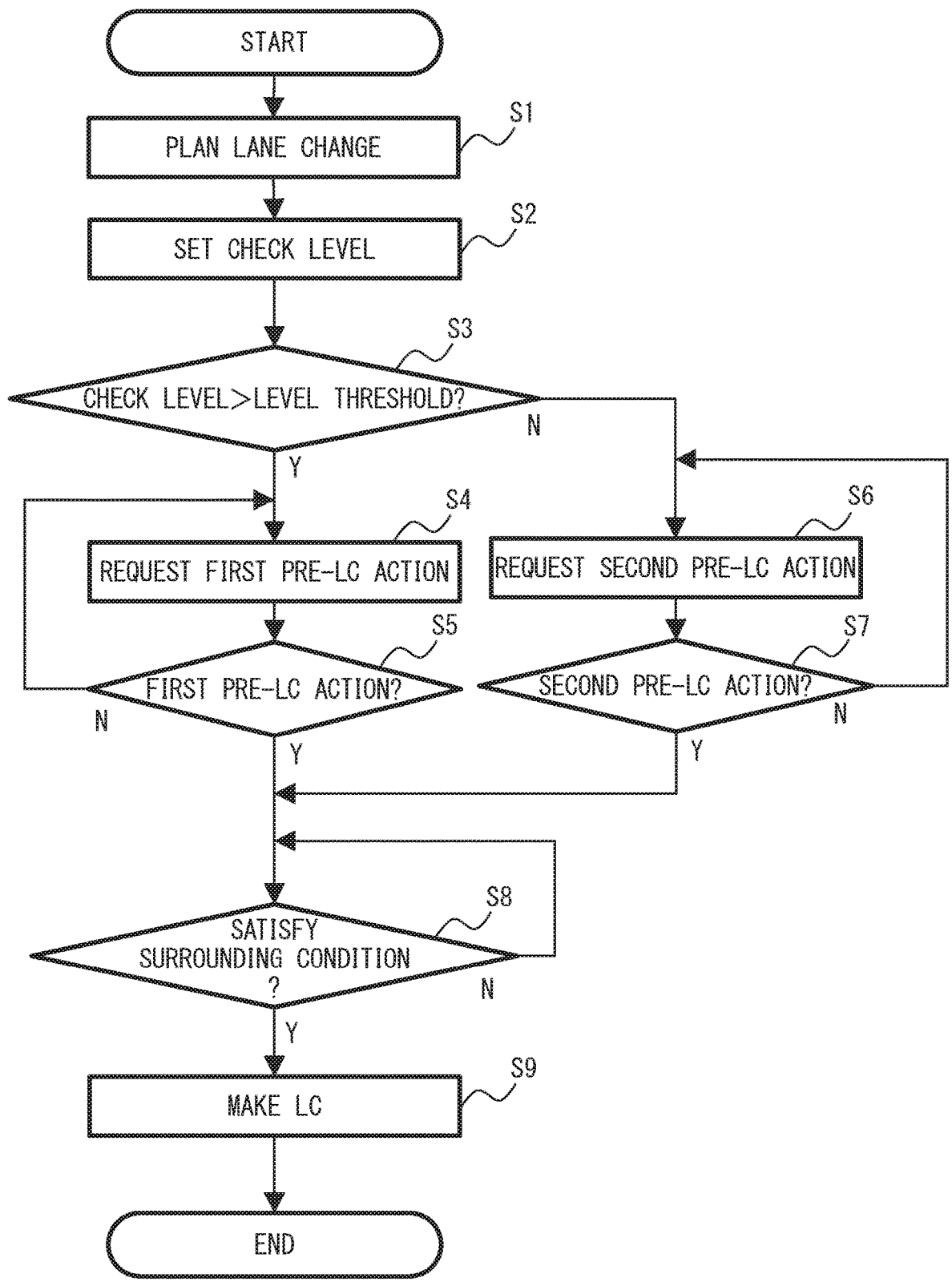
FIG. 6 is a flowchart of a travel control process.

FIG. 6 is a flowchart of a travel control process. The travel controller 7 repeats the travel control process illustrated in FIG. 6 at predetermined intervals (e.g., intervals of 1/10 seconds) during travel of the vehicle 1.

The planning unit 731 of the travel controller 7 plans a lane change for the vehicle 1 to move from the current travel lane to a different lane (step S1).

Next, the setting unit 732 of the travel controller 7 sets a check level depending on the situation of the lane change from the travel lane to the different lane before the lane change (step S2). The check level indicates how closely the driver of the vehicle should check a surrounding area at the lane change.

Subsequently, the request unit 733 of the travel controller 7 determines whether the set check level is higher than the level threshold (step S3).

When it is determined that the check level is higher than the level threshold (Yes in step S3), the request unit 733 requests a first pre-lane-change (hereafter "pre-LC") action for the check at the lane change of the driver with the meter display 4 (step S4). The control unit 734 then determines whether the driver has performed the first pre-LC action having been requested (step S5). When it is determined that the driver has not performed the first pre-LC action (No in step S5), the process by the control unit 734 returns to step S4.

When it is determined that the check level is lower than the level threshold (No in step S3), the request unit 733 requests a second pre-LC action for the check at the lane change of the driver with the meter display 4 (step S6). The second pre-LC action is a lighter burden to the driver than the first pre-LC action. The control unit 734 determines whether the driver has performed the second pre-LC action having been requested (step S7). When it is determined that the driver has not performed the second pre-LC action (No in step S7), the process by the control unit 734 returns to step S6.

When it is determined that the driver has performed the first or second pre-LC action having been requested (Yes in step S5 or S7), the control unit 734 determines whether the situation around the vehicle satisfies a surrounding condition (step S8). The surrounding condition is a condition to be satisfied by the situation around the vehicle 1 at the lane change.

When it is determined that the situation around the vehicle satisfies none of the surrounding conditions (No in step S8), the process by the control unit 734 returns to step S8. When it is determined that the situation around the vehicle satisfies a surrounding condition (Yes in step S8), the control unit 734 controls travel of the vehicle 1 to change lanes (step S9) and terminates the travel control process.

Such a travel control process enables the travel controller 7 to make an appropriate lane change without annoying the driver.

According to a modified example, the situation table stored in the memory 72 includes a situation condition "the driver's operational input to request a lane change is received." When the driver's operational input to request a lane change is received, the travel controller 7 executes the process of step S2 and the subsequent steps of the flowchart in FIG. 6, regardless of whether a lane change is planned by the planning unit 731.

According to the modified example, the setting unit 732 sets check level L3 associated with the situation condition "the driver's operational input to request a lane change is received" as the check level in the situation of the lane change, in step S2 of the flowchart in FIG. 6. Check level L3 is lower than the level threshold.

The driver's operational input to request a lane change is, for example, operation of a lever of turn signals (not shown). The lever of turn signals is connected to the in-vehicle network, and outputs a signal depending on the driver's operation to the travel controller 7. Alternatively, the driver's operational input to request a lane change is, for example, a touch on a display region of a button for requesting a lane change in the meter display 4 overlaid with a touch screen. The touch screen is connected to the in-vehicle network, and outputs a signal depending on the driver's touch to the travel controller 7.

Note that those skilled in the art can apply various changes, substitutions, and modifications without departing from the spirit and scope of the present disclosure.

What is claimed is:

1. A travel controller comprising a processor configured to
   set a check level depending on the situation of a lane change from a travel lane of a vehicle to a different lane before the lane change, the check level indicating how closely a driver of the vehicle should check a surrounding area at the lane change;
   request a first pre-lane-change action for the check at the lane change of the driver with a notification device when the check level is higher than a level threshold, and request a second pre-lane-change action for the check at the lane change of the driver with the notification device when the check level is lower than the level threshold, the second pre-lane-change action being a lighter burden to the driver than the first pre-lane-change action, the first pre-lane-change action being to look at a destination of the lane change, the second pre-lane-change action being to look ahead; and
   control travel of the vehicle to make the lane change in the case that the driver has performed the first or second pre-lane-change action having been requested and that the situation around the vehicle satisfies a surrounding condition to be satisfied at the lane change.

2. The travel controller according to claim 1, wherein the processor determines whether another vehicle exists in a predetermined section of the different lane, and sets the check level higher when it is determined that another vehicle exits than when not.

3. The travel controller according to claim 2, wherein the processor sets the check level lower than the level threshold in the case that the vehicle traveling on the different lane makes a lane change to the travel lane to pass a passing-target vehicle traveling ahead on the different lane and then makes a lane change to the different lane ahead of the passing-target vehicle and that no vehicle is detected in the predetermined section from the passing-target vehicle to a predetermined distance away.

4. The travel controller according to claim 1, wherein the processor sets the check level lower when the lane change is based on instructions of the driver than when not.

5. A method for travel control, comprising:
   setting a check level depending on the situation of a lane change from a travel lane of a vehicle to a different lane before the lane change, the check level indicating how closely a driver of the vehicle should check a surrounding area at the lane change;
   requesting a first pre-lane-change action for the check at the lane change of the driver with a notification device when the check level is higher than a level threshold, and requesting a second pre-lane-change action for the check at the lane change of the driver with the notification device when the check level is lower than the level threshold, the second pre-lane-change action being a lighter burden to the driver than the first pre-lane-change action, the first pre-lane-change action being to look at a destination of the lane change, the second pre-lane-change action being to look ahead; and
   controlling travel of the vehicle to make the lane change in the case that the driver has performed the first or second pre-lane-change action having been requested and that the situation around the vehicle satisfies a surrounding condition to be satisfied at the lane change.

6. A non-transitory computer-readable medium having a computer program for travel control stored therein, the computer program causing a computer to execute a process comprising:
   setting a check level depending on the situation of a lane change from a travel lane of a vehicle to a different lane before the lane change, the check level indicating how closely a driver of the vehicle should check a surrounding area at the lane change;
   requesting a first pre-lane-change action for the check at the lane change of the driver with a notification device when the check level is higher than a level threshold, and requesting a second pre-lane-change action for the check at the lane change of the driver with the notification device when the check level is lower than the level threshold, the second pre-lane-change action being a lighter burden to the driver than the first pre-lane-change action, the first pre-lane-change action being to look at a destination of the lane change, the second pre-lane-change action being to look ahead; and
   controlling travel of the vehicle to make the lane change in the case that the driver has performed the first or second pre-lane-change action having been requested and that the situation around the vehicle satisfies a surrounding condition to be satisfied at the lane change.

* * * * *